(12) United States Patent
Bilisoly

(10) Patent No.: US 6,358,358 B1
(45) Date of Patent: Mar. 19, 2002

(54) METHOD AND APPARATUS FOR PRODUCING SIGNS WITH A WEEDING AND LAMINATING SYSTEM

(76) Inventor: Thomas Bilisoly, 1093 Arroyo Dr., Fullerton, CA (US) 92833-2302

(*) Notice: Subject to any disclaimer, the term of this patent is extended or adjusted under 35 U.S.C. 154(b) by 0 days.

(21) Appl. No.: 09/390,786

(22) Filed: Sep. 7, 1999

(51) Int. Cl.[7] ............................. B32B 3/14; B32B 3/16
(52) U.S. Cl. .................. 156/344; 156/247; 156/249; 156/267; 156/584
(58) Field of Search ........................... 156/248, 249, 156/256, 267, 268, 270, 513, 517, 519, 344, 584; 40/615, 616; 428/40, 41, 137, 213, 220, 350, 42.3

(56) References Cited

U.S. PATENT DOCUMENTS 3,976,528 A * 8/1976 James ........................ 156/244
4,172,750 A * 10/1979 Giulie ........................ 156/267
5,354,401 A * 10/1994 Asahi et al. ................ 156/230

FOREIGN PATENT DOCUMENTS

WO WO-9824619 * 6/1998 ............. B32B/3/14

* cited by examiner

Primary Examiner—Richard Crispino
Assistant Examiner—Cheryl N. Hawkins
(74) Attorney, Agent, or Firm—Fish & Associates, LLP

(57) ABSTRACT

An apparatus for producing signs has a weeder portion for separation of an image element from a non-image element in a sign material to produce a weeded sign material, and a work surface that is mechanically coupled to the weeder portion to receive the weeded sign material. The work surface is sized and dimensioned to allow manual access to the weeded sign material, and the apparatus has a laminator portion mechanically coupled to the work surface to produce a laminated weeded sign material. In a method to produce a sign, a sign material is weeded in a weeder portion of a sign producing apparatus to produce a weeded sign material. The weeded sign material is transferred to a work surface where it can be further processed. The work surface is mechanically coupled to the weeder portion, and processed weeded sign material is laminated in a laminator portion of a sign producing apparatus.

12 Claims, 3 Drawing Sheets

METHOD AND APPARATUS FOR PRODUCING SIGNS WITH A WEEDING AND LAMINATING SYSTEM

FIELD OF THE INVENTION

The field of the invention is signage.

BACKGROUND OF THE INVENTION

Some years ago, signs comprising lettering and other designs were generally painted by hand on a window, door, or other target surface. More modernly, such signs are generally fabricated from a sheeted material using computer aided design. In a typical modern process such as that described in U.S. Pat. No. 4,467,525, which is incorporated herein by reference, a design is developed and visualized using a computer screen, and the final design is then cut into a vinyl sheet using an automated plotter/cutter type device. Those familiar with the art will recognize that the term "vinyl" is used generically herein to represent any suitable plastic or plastic-like sheeted material removably bonded to a backing—regardless of whether or not the sheeted material is chemically a vinyl.

The vinyl sheets employed in automated sign making processes typically have a backing, and once an image is cut into the vinyl, the portion of the vinyl not employed in the design (i.e., the non-graphic area) is separated from the graphics area and the backing. Separation of the waste vinyl is called "weeding". Weeding is often performed by hand, utilizing fingernails, tweezers or the like. However, since the vinyl is often very thin, and is bound to the backing using a tacky adhesive, the process of hand weeding can become very tedious. The problem is exacerbated with letters and other designs having included shapes, such as the letters "O" or "P".

Automated weeders have been developed that partially resolve these problems. U.S. Pat. No. 5,277,736 to Logan (January 1994), for example, which is also incorporated herein, describes an automated system that combines an image cutting implement with a tool that selectively bonds an overlay sheet to the non-graphic areas. By removing the overlay, a user selectively removes the non-graphic areas.

It is also known to produce signage having multiple colors, either by adding a colored ink or other material to the surface of the vinyl, or by employing a sheet having multiple layers of different colored vinyls. Such a system is described in U.S. Pat. No. 5,073,424 to Dressler (December 1991) and U.S. Pat. No. 5236752, also to Dressler (August 1993).

Once weeding is performed for all or part of a design, the design can be installed onto a glass window, door, poster, or other receiving surface. Such installation is usually accomplished by laminating a transfer sheet to the vinyl pattern, lifting the pattern from the backing, possibly adding additional adhesive to the pattern, and then juxtaposing the pattern against the receiving surface. The transfer sheet is then peeled away from the installed pattern.

While there are numerous automated or semi-automated (i.e. hand crank type) weeders, and many different laminators, it is highly unusual to find the two functions implemented together, either in the same physical machine or in cooperating machines. One example where this is done, however, is described in WIPO publication no. 09824619 WO to Meyer, (Australia, published June 1998). In that publication, a weeder/laminator combination carries a sheet of sign material from weeder directly to the laminator, employing in some embodiments a specialized guide system to keep the sign material from puckering and distorting. Such a system is problematic in that complexity is increased unnecessarily, and paper jams and other maintenance issues are unnecessarily difficult to correct. By feeding the sign material directly from the weeder to the laminator, the Meyer system also substantially precludes a user from manually weeding (i.e. hand weeding) non-graphic area following the automated weeding step.

Thus, despite the many advances in the field, there is still a need for a simple, inexpensive, yet effective apparatus and method for performing both weeding and laminating functions.

SUMMARY OF THE INVENTION

The present invention is directed to methods and apparatus in which either a single device or cooperating devices perform both weeding and laminating functions. An apparatus for producing signs has a weeder portion for separation of an image element from a non-image element in a sign material to produce a weeded sign material, and a work surface that is mechanically coupled to the weeder portion to receive the weeded sign material. The work surface is sized and dimensioned to allow manual access to the weeded sign material, and the apparatus has a laminator portion mechanically coupled to the work surface to produce a laminated weeded sign material. In a method to produce a sign, a sign material is weeded in a weeder portion of a sign producing apparatus to produce a weeded sign material. The weeded sign material is transferred to a work surface where it can be further processed. The work surface is mechanically coupled to the weeder portion, and processed weeded sign material is laminated in a laminator portion of a sign producing apparatus.

Various objects, features, aspects and advantages of the present invention will become more apparent from the following detailed description of preferred embodiments of the invention, along with the accompanying drawings in which like numerals represent like components.

DETAILED DESCRIPTION

As used herein, the term "sign material" refers to plastic or plastic-like sheeted material with at least two layers. A base layer is typically employed as a backing, whereas a sign layer is bonded to the base layer using a tacky adhesive. Images are cut into the sign layer, whereby the cut defines the border between an image element and a non-image element. For example, contemplated image elements include characters, symbols, picture elements, etc. The terms "vinyl sheet" and "sign material" are used interchangeably.

Figure 1:
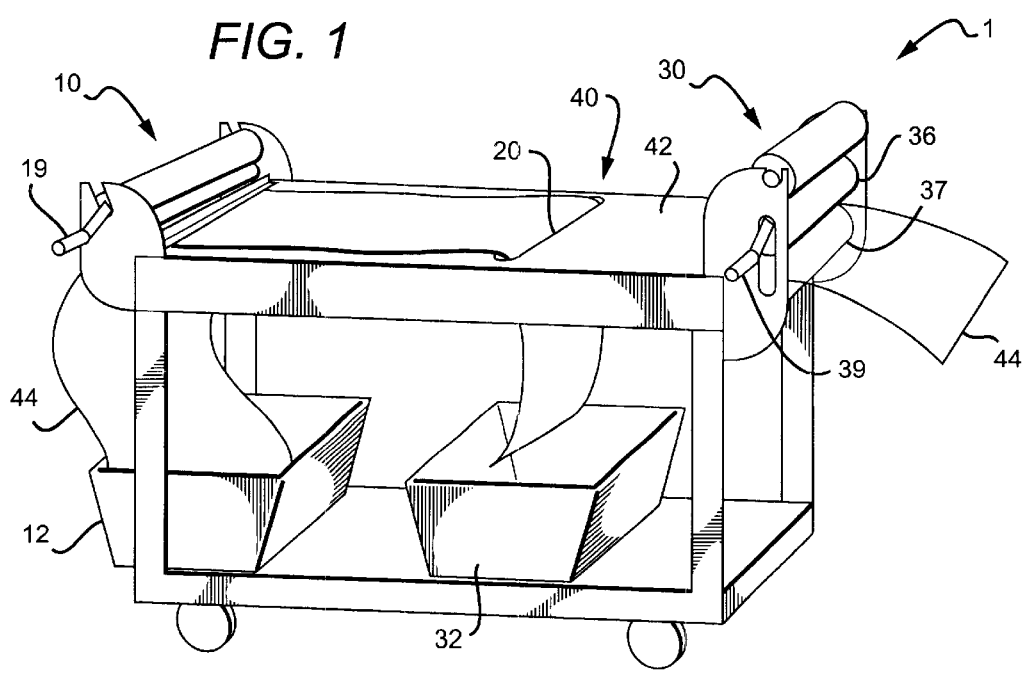
FIG. 1 is a perspective view of an apparatus for producing signs according to the inventive subject matter.

In a preferred embodiment illustrated in FIG. 1, an apparatus for producing signs 1 includes a weeder portion 10, a feed or recovery basket 12, a feed or recovery slot 20, a laminator portion 30, a feed or recovery basket 32, and a portable rolling table 40 as a work surface, wherein weeder portion 10 and laminator portion 30 are mechanically connected to table 40.

Figure 2:
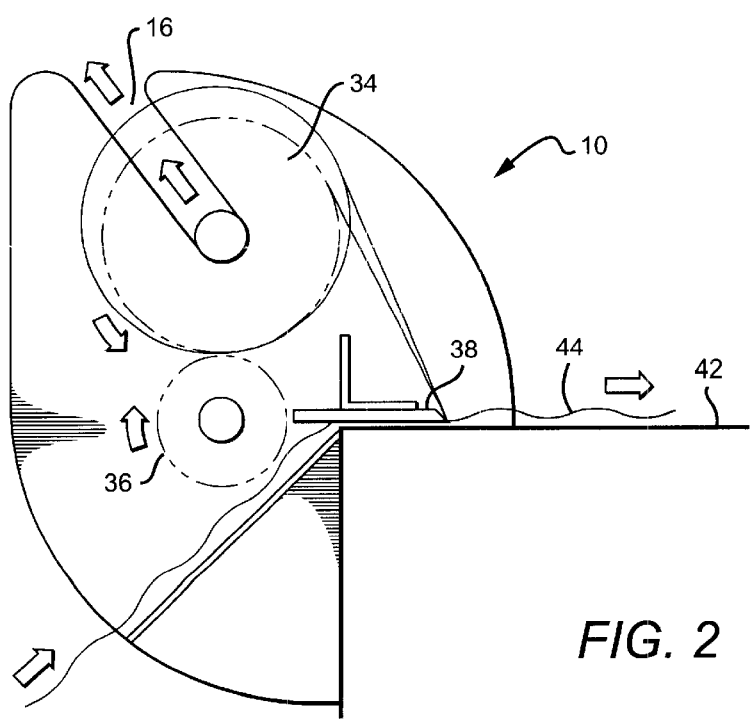
FIG. 2 is a side view of a weeder portion according to the inventive subject matter.

In FIG. 2 the weeder portion 10 uses the collector spool 34 to pull out vinyl material 44 through nylon separator blade 38 thus "weeding" vinyl. Material which is collected onto weed collector spool 34 is compacted by stationary compactor roller 36. While weed collector spool 34 expands with collected weed material, titled channel 16 maintains weed collector spool 34 at desired degree of angle from nylon separator blade 38.

Figure 3:
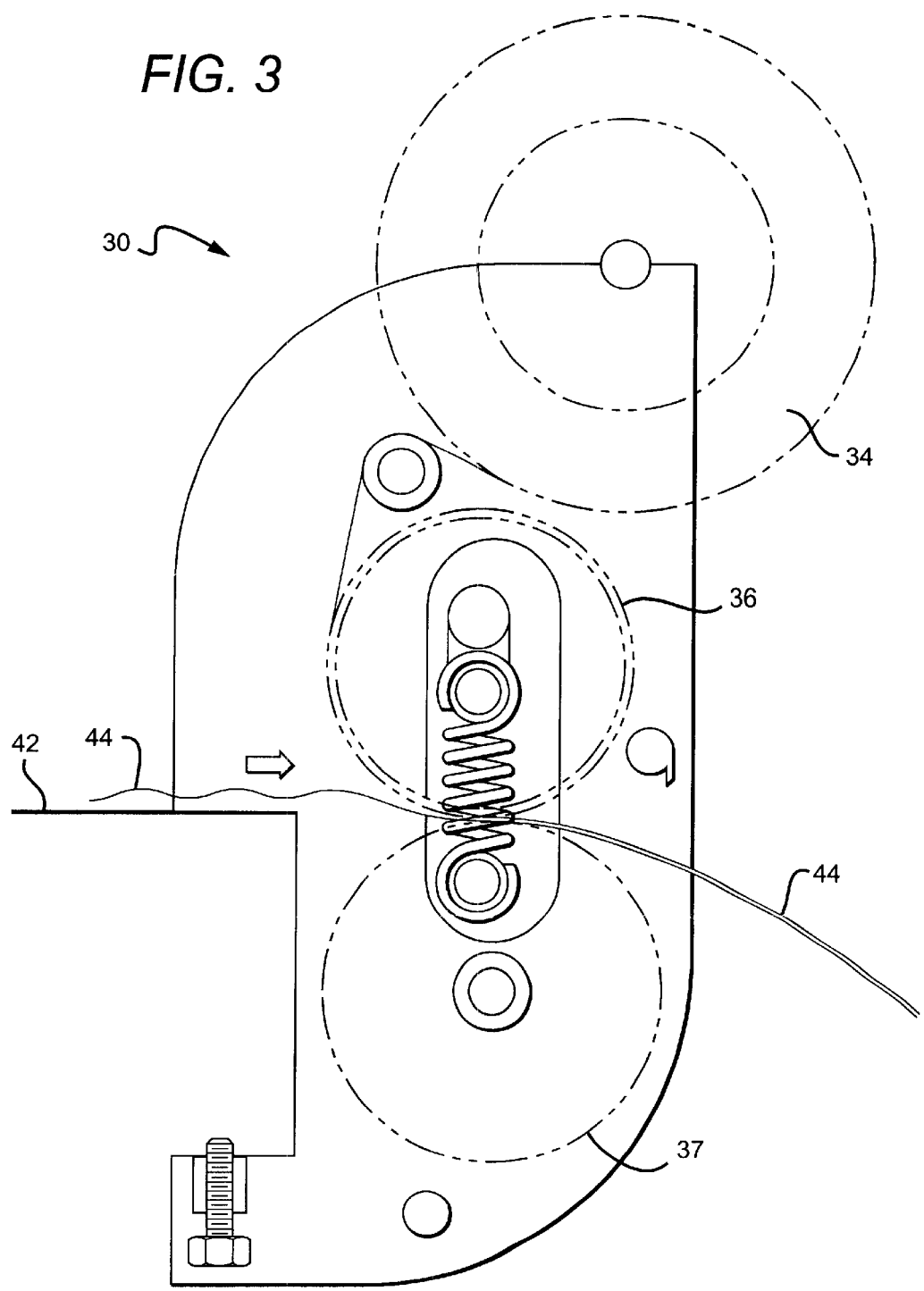
FIG. 3 is a side view of a laminator portion according to the inventive subject matter.

In FIG. 3 the laminator portion 30 preferably uses a laminate supply spool 34 which feed laminate material onto face of vinyl 44 under pressure between rubber roller 36 and Teflon™ (perfluorinated polyethylene, trademark of DuPont) roller 37, thus laminating vinyl material 44.

Figure 4:
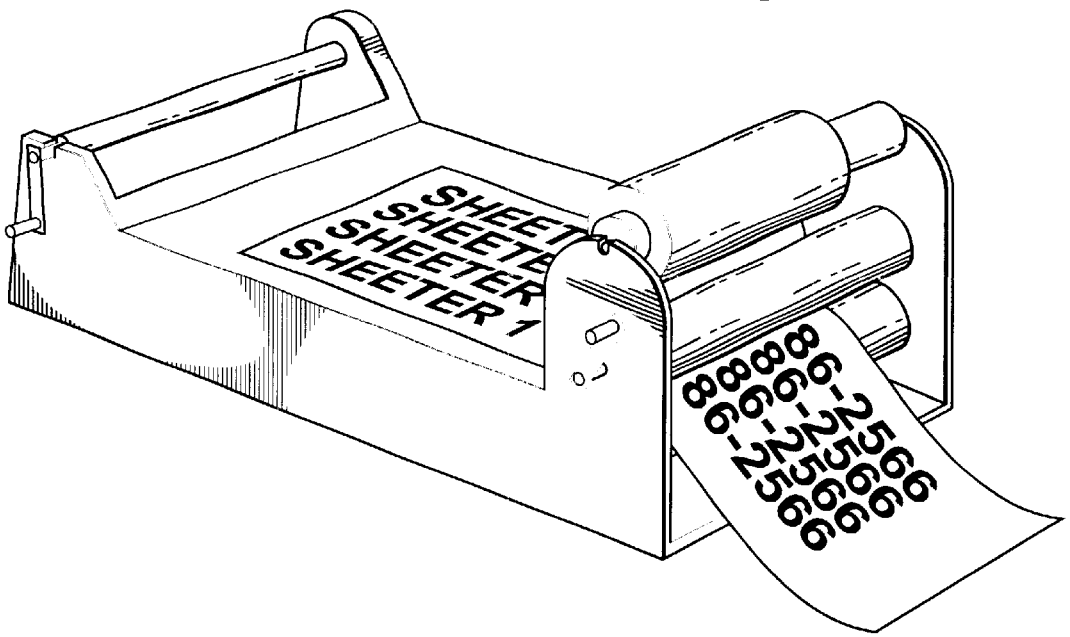
FIG. 4 is a photograph of one preferred embodiment according to the inventive subject matter.
Figure 5:
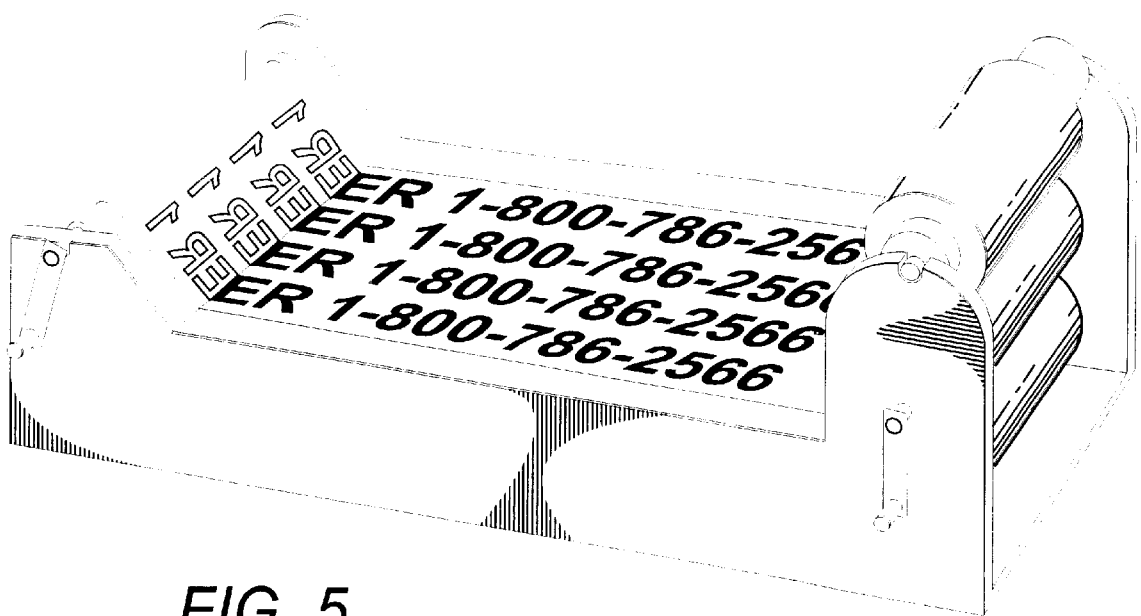
FIG. 5 is a photograph of an exemplary work piece in another embodiment according to the inventive subject matter.

Photograph FIGS. 4 and 5 depict particularly preferred embodiments incorporating the designs of FIGS. 1 and 2.

In operation, a pattern is cut into a sheet 5 of sign material, and the sheet is run through the weeder portion 10, thereby weeding the image portion from the non-image portion and producing a weeded sign material. The weeded sign material is then transferred to a work surface that is mechanically coupled to the weeder portion to further process the weeded sign material. Processing steps may include manually removing of image elements or non-image elements, applying, or further modifying image elements on the base layer, painting or drawing on the image elements, etc. Once weeding and processing are performed, the processed weeded sign material is run through the laminator portion 30, which applies a laminate from laminate supply spool 34. Although laminator portion 30 preferably has a Teflon™ roller, other non-stick coatings or material are also contemplated, including high-density polyethylene, marble, etc. It should be appreciated that both the sign material and processed weeded sign material may manually, but also automatically fed through the weeder portion and the laminator portion.

In alternative embodiments it is contemplated that table 40 could be split or otherwise separated into two physically separate work areas, each including a weeder portion 10 and a laminator portion 30.

A particularly important feature here is that the sheeted material traveling through device 1 is accessible to a user for hand weeding. To that end table 40 preferably includes a work surface 42, and the sheeted material does not necessarily travel directly from weeder portion 10 to laminator portion 30. It is contemplated that the weeder portion, and the laminator portion may be mechanically connected to the work surface. Appropriate mechanical connections include temporary and permanent mechanical connections. Contemplated temporary connections include screws, dowels, clamps, and locks. Contemplated permanent mechanical connections include welded, soldered, and machined connections. Alternatively, weeder portion and laminator portion may be integral parts of the work surface. With respect to work surface 42 it is contemplated that the work surface has a width W and a length L, wherein the width W is at least 1.1 times the width of the weeded sign material, and wherein the length L is at least 2 times the width W. For example, an appropriate work surface may have a width of 1.5 times the width of the weeded sign material, and may have a length of 2.5 times the width of the weeded sign material. Furthermore, the work surface may be a separate entity, but may also be a table or a workbench, which may or may not have an opening to receive weeded sign material. It is further contemplated that one or both of weeder portion 10 and laminator portion 30 may operate under motor control, but preferably each of these operate by hand crank 19 and 39, respectively (shown in FIGS. 3 and 4) to reduce cost and improve control. Thus, weeder portion 10 and laminator portion 30 can be operated independently, and manually.

Thus, specific embodiments, methods and applications of an apparatus for producing signs have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises", "comprising", and should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for producing signs comprising:
   a weeder portion, comprising a weed collector spool, a compactor roller, and a separator blade, operatively coupled to separate an image element from a non-image element in a sign material to produce a weeded sign material;
   a work surface mechanically coupled to the weeder portion that receives the weeded sign material, and provides manual access to the weeded sign material;
   a laminator portion mechanically coupled to the work surface, that laminates the weeded sign material.

2. The weeder portion of claim 1 further comprising a tilted channel to movably adapt the weed collector spool.

3. The apparatus of claim 1 wherein the weeder portion is manually operated.

4. The apparatus of claim 1 wherein the work surface has a width W and a length L, wherein the width W is at least 1.1 times the width of the weeded sign material, and wherein the length L is at least 2 times the width W.

5. The apparatus of claim 1 wherein the work surface is a table or a work bench.

6. The apparatus of claim 1 wherein the work surface comprises an opening that receives the weeded sign material.

7. The apparatus of claim 1 wherein the laminator portion comprises a laminate supply spool, a rubber roller, and a non-stick roller.

8. The apparatus of claim 1 wherein the laminator portion is manually operated.

9. The apparatus of claim 1 wherein the laminator portion is mechanically connected to the work surface.

10. The apparatus of claim 1 wherein the weeder portion and the laminator portion are independently operated.

11. The apparatus of claim 1 wherein the weeder portion and the laminator portion are integral parts of the work surface.

12. The apparatus of claim 1 wherein the work surface is physically separated into a first work area and a second work area, wherein the first work area is mechanically coupled to the weeder portion, and the second area is mechanically coupled to the laminator portion.

* * * * *